United States Patent [19]

DasGupta

[11] Patent Number: 5,684,299
[45] Date of Patent: Nov. 4, 1997

[54] METHOD FOR DETERMINING POROSITY IN AN INVADED GAS RESERVOIR

[75] Inventor: Urmi DasGupta, Houston, Tex.

[73] Assignee: Schlumberger Technology Corporation, Houston, Tex.

[21] Appl. No.: 494,658

[22] Filed: Jun. 26, 1995

[51] Int. Cl.$^6$ .................................................. G01V 5/14
[52] U.S. Cl. ................... 250/269.2; 250/266; 250/269.3; 250/269.4
[58] Field of Search ............................ 250/269.2, 269.3, 250/269.4, 266

[56] References Cited

U.S. PATENT DOCUMENTS 3,453,433  7/1969  Alger et al. ...................... 250/269.2
5,349,184  9/1994  Wraight ............................. 250/266
5,459,314  10/1995  Plaser ............................. 250/269.3

*Primary Examiner*—Carolyn E. Fields
*Attorney, Agent, or Firm*—Darcell Walker; John J. Ryberg

[57] ABSTRACT

The formation porosity of a partially invaded gas reservoir in subsurface earth formation is determined from the sum of percentages of density and neutron tool porosities. During the method of this invention, density tool and neutron tool porosity measurements are taken of the formation. These porosity measurements are fitted to a predetermined porosity to determine the percentage of each porosity measurement that will be summed to estimate the formation porosity of the gas reservoir. The percentages of the density and neutron porosity measurements are dependent on a correction factor that is determined from the fitting process.

23 Claims, 8 Drawing Sheets

METHOD FOR DETERMINING POROSITY IN AN INVADED GAS RESERVOIR

FIELD OF THE INVENTION

This invention relates to a method of determining formation porosity in a gas reservoir. In particular it relates to a method of determining the true formation porosity in an invaded gas reservoir using density and pulse neutron logs.

BACKGROUND OF THE INVENTION

A popular method of obtaining a formation porosity estimate is based on the simultaneous use of neutron and density logs. Under normal logging conditions, the porosity estimates obtained from these tools agree, when plotted on an appropriate lithology and fluid scale. However, in the case of a reservoir where there is gas instead of water or oil in the pore space, the two porosity logs separate, to form what is referred to as gas crossover. Under these conditions, the true formation porosity lies between the measured neutron and density values. Log interpreters often find it difficult to accurately estimate the true formation porosity from these two curves.

Neutron and density logging tools have different responses to the presence of gas in the formation because of differences in the physics of the measurements. A neutron tool response is sensitive mainly to the number of hydrogen atoms in the formation. During the calibration process, water-filled formations are used to develop porosity algorithms, and under these conditions, a lower number of hydrogen atoms is equivalent to a lower porosity. Consequently, when a gas-filled formation is logged, which has a lower number of hydrogen atoms than a water-filled formation of the same porosity, the porosity estimate will be lower than the true porosity.

The density tool, on the other hand, measures the total number of formation electrons. Like the neutron tool, water-filled formations are used in its calibration process. Under these conditions, a lower number of electrons is equivalent to a lower formation density, or a higher formation porosity. Therefore, logging a gas-filled formation, results in a porosity estimate that is higher than the true porosity. Overlaying the neutron and density curves in a gas-bearing zone results in the classic crossover separation.

The process of estimating the true porosity in the gas region relies on the appropriate use of the two porosity logs. The process is further complicated by the effects of borehole fluid invasion. Invasion tends to force the gas from the formation and replace it with borehole fluid. The neutron tool begins to sense the presence of more hydrogen atoms and yields a porosity estimate that is higher than before when only the gas was present; the opposite occurs for the density tool. The increase in the amount of water in the near formation, i.e., the increase in the number of electrons, is interpreted by the density tool algorithm as a higher density which translates into a lower porosity estimate. The end result is that the separation between the two curves begins to disappear as the invasion front increases in radial depth. The rate at which the two porosity logs approach the true porosity depends upon their radial sensitivities and their respective depths of investigations (DOI).

As the invasion fluid front gets deeper into the reservoir, the neutron and density porosity measurements approach the true porosity. For shallow invasion, i.e. shallow with respect to the depths of investigation (DOIs) of the two tools, the tools' responses are spatially weighted averages of the invaded and noninvaded regions of the formation. The result is a reduced crossover. For deep invasion (invasion beyond the DOIs of both tools) the crossover indication disappears and the two logs will not recognize the presence of gas.

A main complication in deriving an accurate porosity in the presence of shallow invasion comes from the fact that the neutron and density devices typically have different DOIs. It is well known that the 50% DOI of the thermal neutron porosity tool is 6 to 12 inches (15.24 to 30.48 cm) depending upon the porosity and gas saturation of the formation and the 50% DOI of the gammagamma density tool is about 2 to 3 inches (5.08 to 7.62 cm). When the invasion front is greater than 12 inches (30.48 cm), both tools see only water-filled formations and the two porosity estimates agree and read true porosity. When the invasion front is less than 12 inches (30.48 cm) but greater than 6 inches (15.24 cm), the density tool sees only the invaded formation while the neutron tool is sensitive to both the invaded and the noninvaded region. Under these conditions, the density porosity estimate is the true value, while the neutron porosity estimate is still low. Below 6 inches (15.24 cm) of invasion, both tools are sensitive to both the invaded and noninvaded regions. Thus, for a certain range of depths of invasion, accurate determination of formation porosity becomes very difficult.

Without the knowledge of the depth of the invasion front, porosity determination in the intermediate invasion range becomes virtually impossible. However, cross plot techniques rely on combinations of the neutron and density data that can be tuned to a particular invasion front depth. For example, the commonly used root-means-square (RMS) equation for gas reservoirs:

$$\phi_{formation} = \sqrt{(\phi \text{Density}^2 + \phi \text{Neutron}^2)} \qquad (1)$$

gives accurate porosity estimates for every shallow invasion of approximately 1 inch (2.54 cm), but can be up to 5 p.u. too low for 4 inch (10.16 cm) invasions. The simple arithmetic average of the estimates, still used by many log analysts, introduces even larger errors. Multivariate techniques can in principle, model the density and neutron responses correctly for any invasion diameter. However, since this diameter is rarely known, the common practice is to assume no invasion. In such cases, porosity and gas volumes can be obtained correctly only for very shallow, or no invasion.

Recent attempts at obtaining better porosity estimates under these conditions have been reported. These attempts show that the use of a neutron porosity device which has a DOI similar to that of the density device could simplify porosity evaluation in gas reservoirs. However, as previously stated, in a partially invaded gas information, there can be a large error in the determination of the true porosity using either the density or neutron measurement. Therefore, a means is needed for determining the true porosity at an unknown formation depth of invasion using the measured density and neutron porosities in a gas zone or partially saturated gas zone.

SUMMARY OF THE INVENTION

It is an object of this invention to determine true earth formation porosity using measurements from density and neutron logs.

It is another object of the invention to determine an accurate estimation of the formation porosity in a gas reservoir.

It is another object of the invention to determine true formation porosity of an invaded gas formation independent of mud flitrate invasion.

In the present invention, the combined responses of a neutron tool and density tool can be used to identify gas zones on a log and determine the true porosity of that gas zone. In gas, the Litho Density Tool (LDT), measures a porosity which is much higher than the true porosity. The Accelerator Porosity Tool (APT), on the other hand, measures the hydrogen index of the formation and sees a low porosity. While gas can be detected using the cross-over in the density and neutron porosity logs, the true porosity and consequently the amount of gas in the reservoir is not known. Additionally, invasion of the formation by borehole fluids can further complicate the detection and quantification of gas in a reservoir.

The present invention uses the density and neutron measurements to determine the true porosity of a gas zone in an earth formation. In the present invention, true porosity is expressed as follows:

$$\phi_{formation} = A^* \phi_{LDT} + (1-a)^* \phi_{APT-N/A} \qquad (2)$$

where A is a gas correction factor, $\phi_{LDT}$ is the density tool porosity measurement, $\phi_{APT-N/A}$ is the neutron near/array porosity measurement.

In the method of this invention, porosity measurements are taken with both the density and neutron porosity tools. The actual porosity of the formation is determined using the above equation with porosity values for LDT and APT.

DETAILED DESCRIPTION OF THE INVENTION

Figure 1:
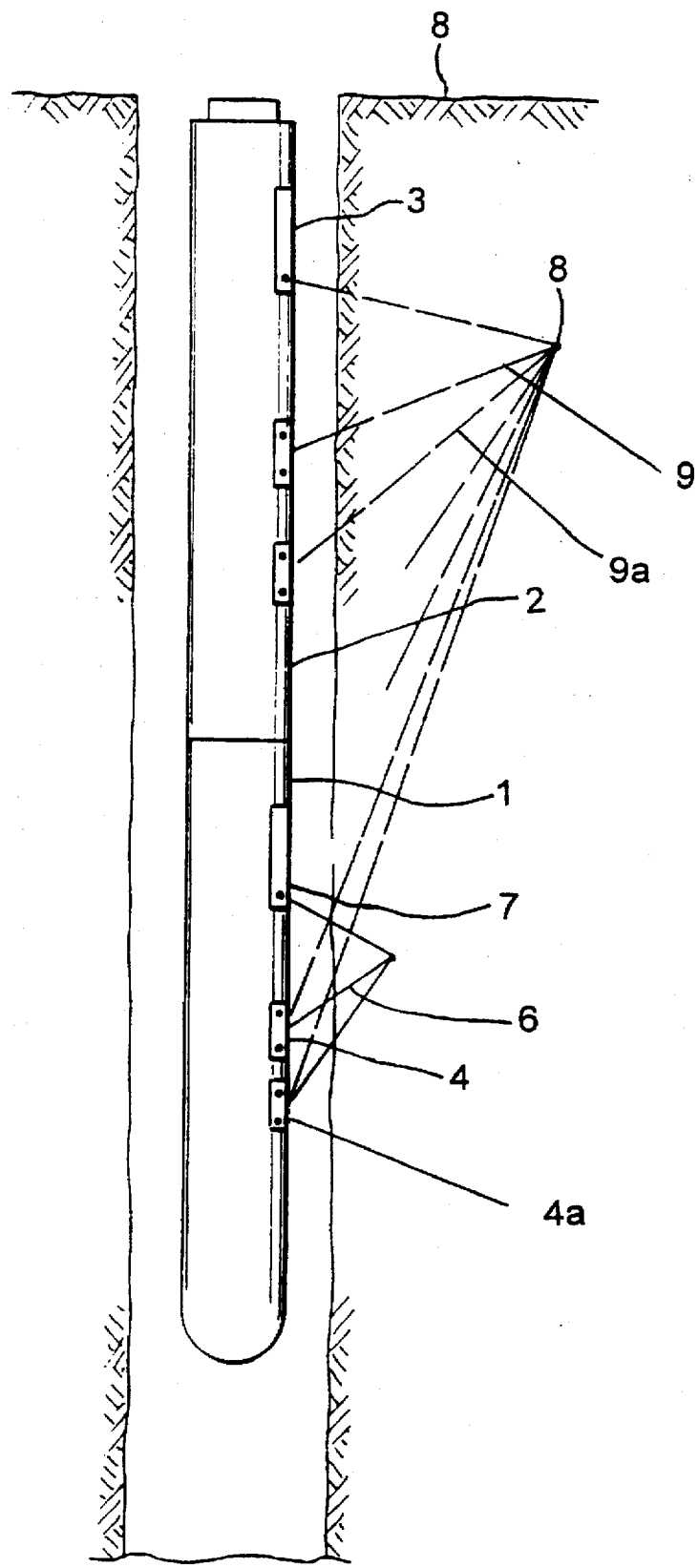
FIG. 1 shows a neutron logging tool string arrangement that can be used in the present invention.

Results of a modeling study demonstrate that the use of an Accelerated Porosity Tool (APT) sonde allows a more accurate estimate of porosity in partially invaded gas formations without requiring knowledge of the fluid invasion front. Referring to FIG. 1, a logging tool string arrangement is shown that can be used in the present invention. This logging string is comprised of a density tool 1 and a neutron porosity tool 2. Both tools take different measurements simultaneously measuring density and porosity. The density tool has a source 7 and a pair of detectors 4 and 4a. In a typical density measurement operation, source 7 emits gamma rays into the earth formation and detectors 4 and 4a detect back-scattered gamma rays 6. From the detected gamma rays counts, a formation density is calculated for the earth formation at that depth. As mentioned previously and shown in FIG. 1, the depth of investigation (DOI) for the density measurements is shallower than the DOI for the neutron tool porosity measurement.

The neutron tool 2 operates in a manner similar to density tool. A source 3 emits neutrons and detectors 9 and 9a detect neutrons. Neutron tools often have a plurality of detectors where neutrons from various depths in the formation are detected. One specific neutron logging tool that can be used has three detectors. This particular tool detector arrangement is described and shown in U.S. Pat. No. 5,349,184 (Wraight) which is incorporated by reference herein or any similar tool.

In the present invention, the measurement of interest in a three detector neutron tool is the array (middle) detector measurement. As described in Wraight, the reason for the array preference is that while it is well known that spatial neutron porosity measurements are strongly affected by formation lithology and formation matrix density, the lithology and matrix density effects on these porosity measurements are reduced by proper selection of detector spacings relative to an accelerator neutron source. Specifically, a source to detector spacing range of about eleven to thirteen inches (array detector location) substantially reduces the matrix density effects on porosity measurements.

The neutron detectors measure a count or flux of epithermal neutrons returned to the borehole. However, the neutron count is affected by matrix density in two ways; (1) The attenuation of the neutron flux and (2) back scattering of the neutron flux.

At detector locations near the source, for example, shorter than ten inches, the matrix density negatively impacts the measured porosity. This negative impact is understood to be caused by the fact that at very short spacings less than ten inches, a back scattering of the neutrons dominates the neutrons flux and for a given hydrogen index (ratio of the concentration of hydrogen atoms in the formation to the concentration of hydrogen atoms in water at standard conditions) of the formation, the detected neutron flux increases as the matrix density increases.

At detector locations far from the source, for example, greater than twenty inches, the matrix density effects positively impact the measured porosity. This positive impact is understood to be caused by the fact that at large spacings, greater than twenty inches, the rock matrix part of the earth formation can be considered as a scattering medium which attenuates the neutron flux scattered back into the detectors. The attenuation effect dominates the neutron flux and for a given hydrogen index of the formation, the detected neutron flux decreases as the matrix density increases.

Although there is a reversal of the matrix density effects at detector locations near to and far from the source, there is a source to detector spacing range typically between eleven to thirteen inches, where the effects of the forward attenuation and back scattering phenomenon cancel each other and the returned neutron flux is practically independent of the matrix density and is only sensitive to the hydrogen index of the formation. This spacing is referred to hereinafter as the "Matrix Density Neutral" distance, or the MDN distance. This greater understanding of the matrix density effects on formation porosity when measured by spatial slowing down length led directly to the discovering of the MDN zone.

The apparatus reduces the matrix density effects on porosity measurements of a subsurface earth formation using epithermal neutrons from an accelerator source. A detector is located at a MDN distance from the neutron source. The borehole and earth formation are irradiated with high energy neutrons which interact with the borehole and earth formation to produce populations of epithermal neutrons. Several neutron population counts are measured at the detector. These counts are combined with each other and used to derive a porosity measurement of the formation that has reduced sensitivity to lithology and matrix density effects.

Several Monte Carlo (MCNP) modeling computations were performed concerning the present invention. The APT near/array and near/far count rate ratios were computed and normalized in order to reflect the measured tool response. These normalization factors were previously determined by benchmarking with laboratory measurements made for lime, sand and dolomite at 3 porosities each. The ratios were then converted to an apparent dolomite porosity using the same ratio to porosity transform that is used in the actual APT tool. Similarly, the density response was generated using the LDTMOD forward modeling package. The density was then converted to an apparent dolomite porosity using the transform for the actual LDT tool.

In accordance with the method of the present invention, the porosity response of the density tool will be compared to that of the neutron tool in order to understand the combined density-neutron response for the invaded gas formation.

Figure 2:
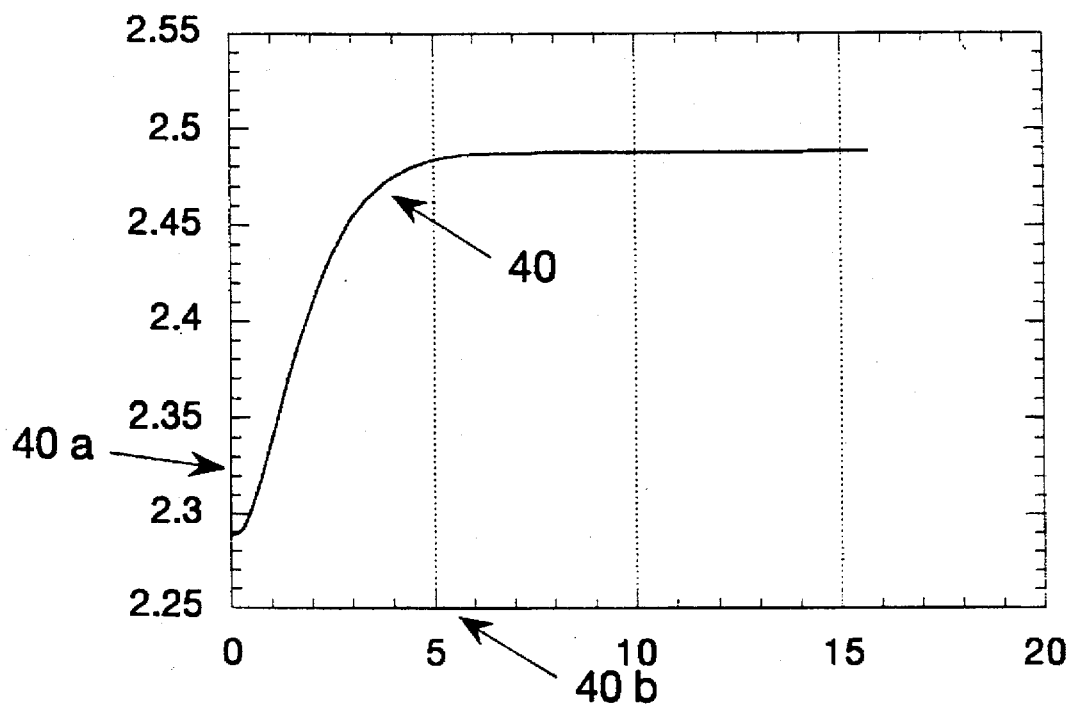
FIG. 2 shows a computed bulk density measurement in 20 p.u. dolomite/gas with fresh water invasion.

Referring to FIG. 2, a density tool response is shown as a function of the depth of invasion. The bulk density is computed in 20 pu dolomite formation where the pore space is filled with a mixture of 90% gas and 10% salt water. The formation is invaded by fresh water from the borehole. The bulk density 40 measured by the density tool is shown as a plot of bulk density 40a versus depth of invasion into the formation 40b. The density porosity was computed from the bulk density using the matrix density of the dolomite formation and the density of the fresh water invading the formation as shown in the following equation.

$$\phi = \left( \frac{\rho\ \text{matrix} - \rho\ \text{bulk}}{\rho\ \text{matrix} - \rho\ \text{fluid}} \right) \quad (3)$$

where ρ fluid=1.00 gm/cc, ρ matrix=2.86 gm/cc

Figure 3:
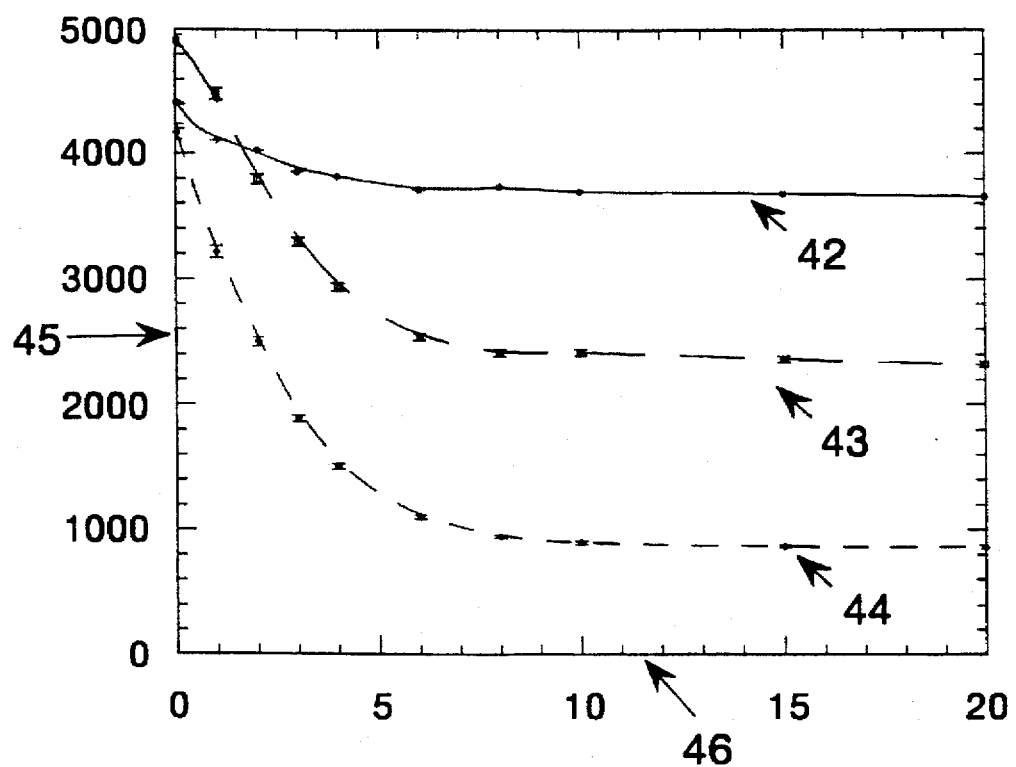
FIG. 3 shows APT modeled count rates for near, array and far detectors as a function of depth of invasion in the formation.

As previously discussed, FIG. 2 shows a density tool response as a function of the depth of invasion in a gas reservoir. FIG. 3 shows the results of the neutron tool for the same modeling computations. The neutron tool response was modeled for the near 42, array 43 and far 44 epithermal detectors for 11 depths of invasion out of 20 inches. The near, array and far count rates 45 (unnormalized) are shown in FIG. 3. The APT near/array and near/far ratios were computed for the gas dolomite formation as a function of invasion depth 46. Note that the array count rate is that from a single array detector while the near/array count rate ratio response is computed by summing the counts form both the array detectors. The count rates were normalized in order to reflect the true count rate ratios that would be measured by the tool. These normalized factors were previously determined by benchmarking MCNP computations to laboratory data.

Figure 4:
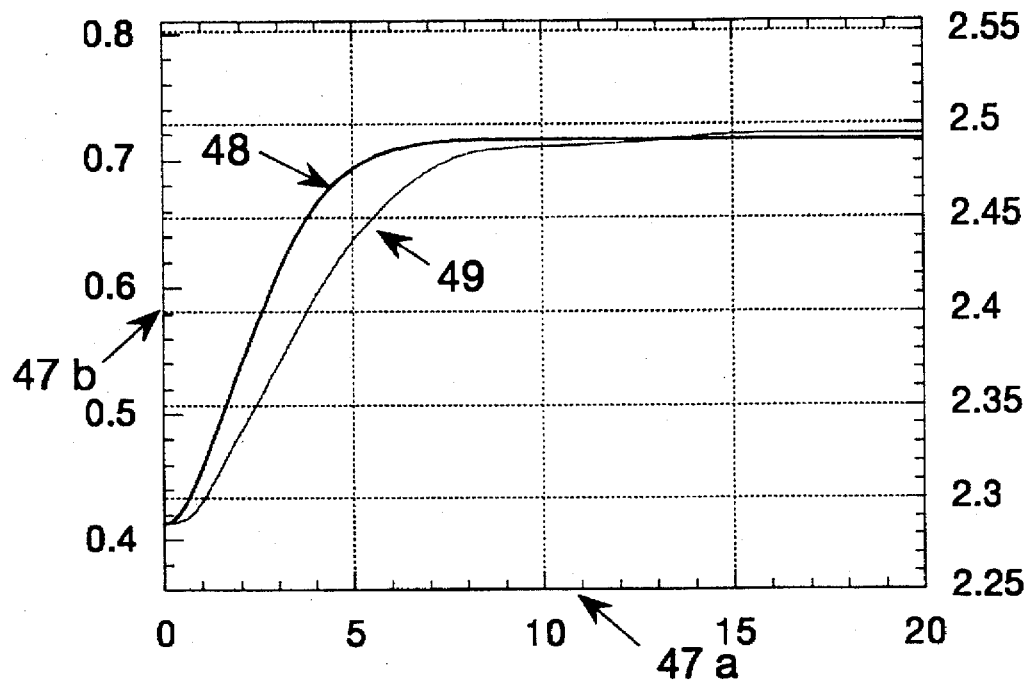
FIG. 4 shows neutron Near/Array and density response as a function of invasion.
Figure 5:
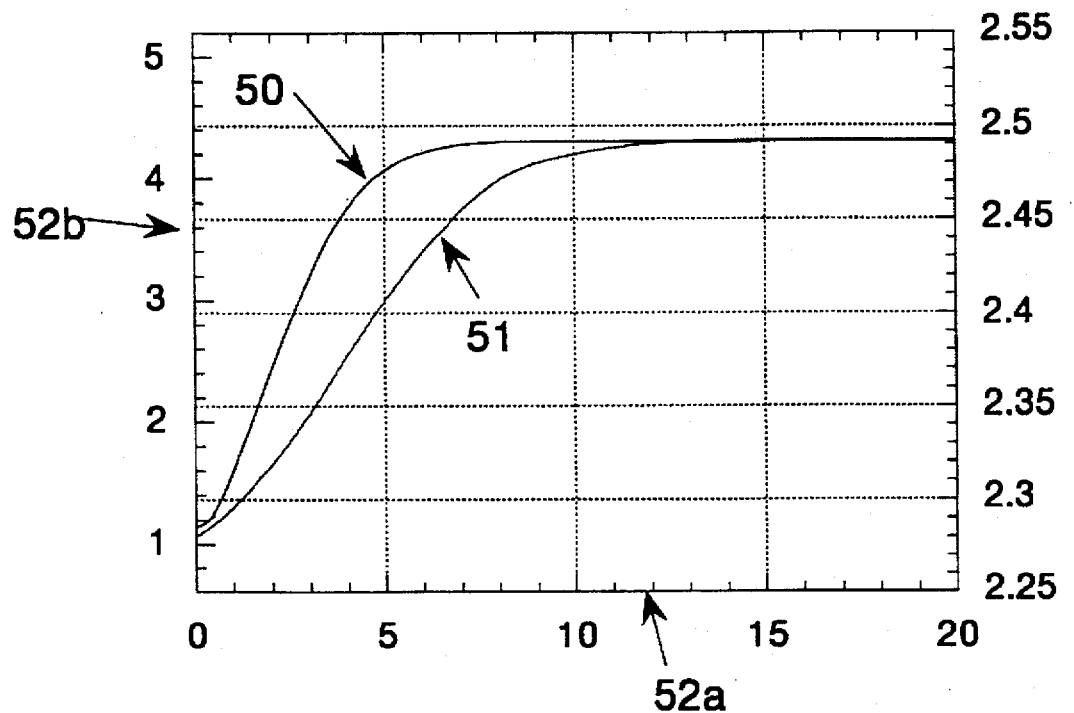
FIG. 5 shows neutron Near/Far and density response as a function of invasion.

FIGS. 4 and 5 illustrate the difference between the density response and the neutron tool responses as a function of invasion distance. In this figure, 47a is the depth of invasion in inches, 47b is the porosity and 47c is the density in gm/cc.

FIG. 4 shows the density response 48 and neutron response 49 for the near/array ratio. In this figure, 52a is the depth of invasion in inches, 52b is the porosity and 52c is the density in gm/cc. FIG. 5 shows the density response 50 and neutron response 51 for a near/far ratio. As shown, for the same invasion depth, the near/far samples deeper into the formation than the near/array. It can be seen that the depth sensitivity of the near/army ratio shown in FIG. 4 matches the density more closely than the near/far ratio shown in FIG. 5. The better match of the near/array and density provides a means for deriving a good estimate of the true formation porosity that is independent of the depth of invasion.

Figure 6:
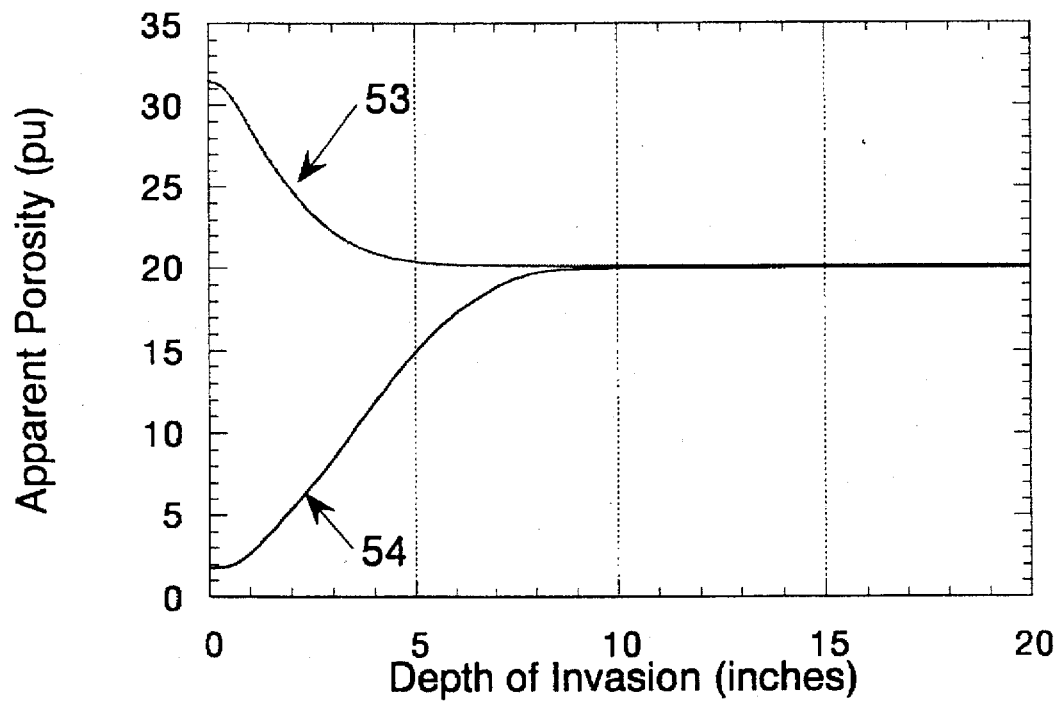
FIG. 6 shows density and neutron near/array cross-over in an invaded gas dolomite formation.
Figure 7:
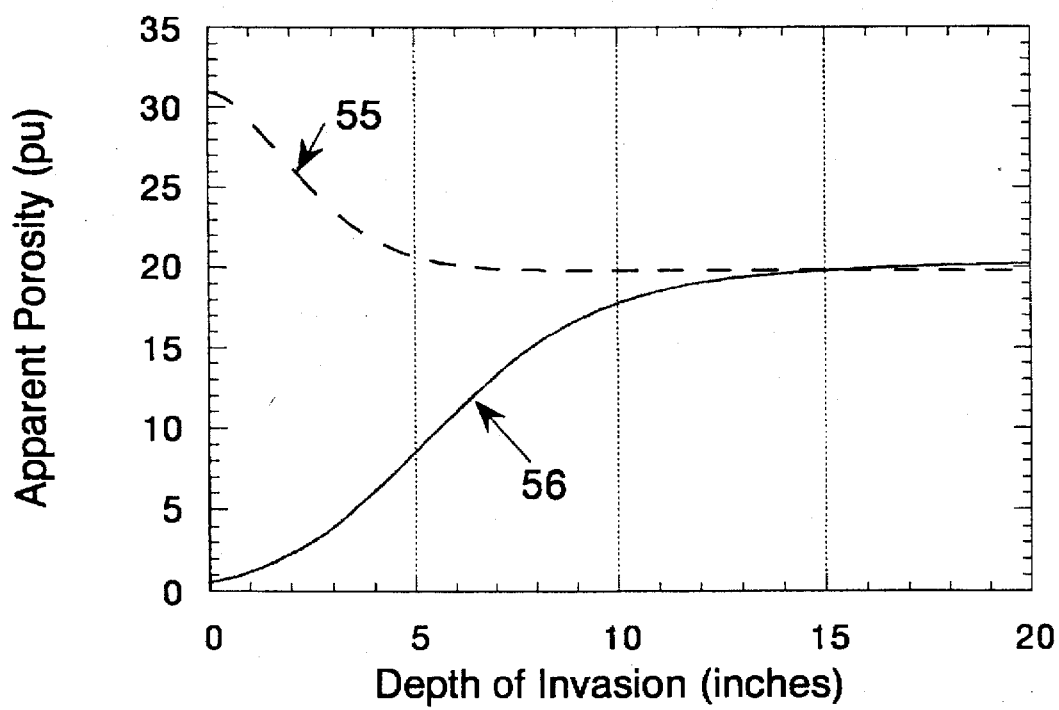
FIG. 7 shows density and neutron near/far cross-over in an invaded gas dolomite formation.

FIGS. 6 and 7 illustrate the cross-over effect of density and neutron porosity. FIG. 6 shows density 53 and near/array neutron 54 apparent porosity measurements. FIG. 7 shows density 55 and near/far neutron 56 porosity measurements. As shown, the cross-over effect of the density and neutron porosities is more apparent at smaller invasion depths. In the gas filled uninvaded formation, the density tool measures a porosity of 31 pu. The APT near/array and near/far read less than 2 pu in the uninvaded formation. The measured porosities approach the true porosity as the depth of invasion increases.

As previously mentioned, under normal conditions, the porosity estimates obtained from the density and neutron tools agree in fluid filled formations when plotted on an appropriate lithology scale. However, where there is gas instead of water or oil in the pore space, the two porosity logs separate to form a gas crossover. In these cases the true porosity lies between the measured neutron and density values.

Figure 8:
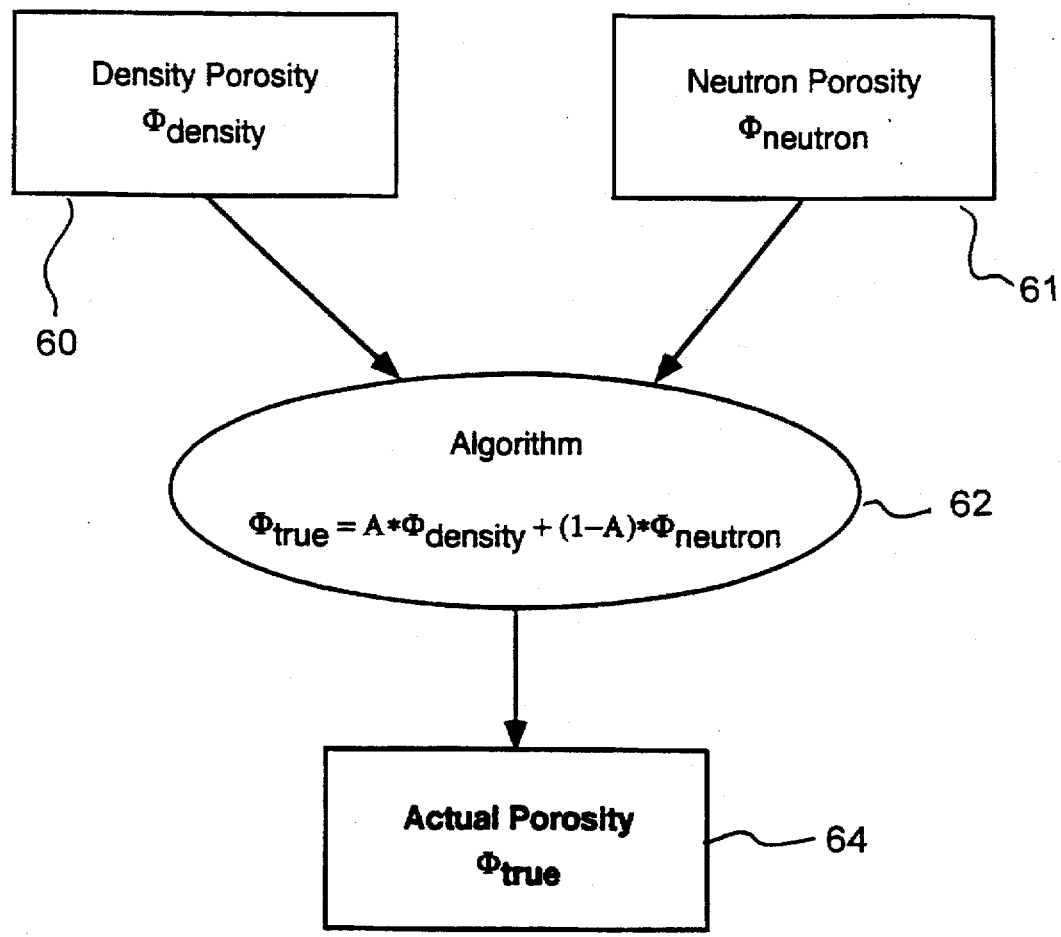
FIG. 8 shows a block diagram of the present invention.

The method of the present invention applies a simple linear combination of two porosity estimates as shown in FIG. 8. In this method, a determination is first made of the porosities of both the neutron and density tools. An estimate of the true formation 64 porosity is made from the density porosity 60 and the neutron porosity 61 using an equation 62 of the form:

$$\phi_{Formation} = A\ \phi_{Density} + (1-A)\ \phi_{APT-Neutron} \quad (4)$$

In determining the true porosity, the linear combination of the two porosities is fitted using a least squares fit method. From this fitting procedure, the correction factor A is determined. In equation 4, the correction factor A is applied to the density porosity. The density porosity is the dominant porosity in the true porosity measurement because it is least affected by the invasion of fluid into the reservoir. The portion of the neutron porosity in the true porosity is (1–A). Therefore, the portion of the neutron and density porosity that makes up the true are interdependent on each other.

In the least squares fitting process, both the density and neutron porosity measurements can be fitted and adjusted simultaneously to get the best fit. In the fitting process the linear combination of the two porosity measurements are fitted to a the true formation porosity. The value of the coefficient A is adjusted to obtain the best possible fit. Using this coefficient A, fractions of the values of the two porosities are summed to get the true formation porosity.

Although less preferred, the least square method can be practiced using only one of the porosities. In this case, the unknown porosity could be determined from equation 4 or an appropriate equivalent equation. In the case of fitting only the density porosity, the correction factor A is derived from getting the best fit of the density measurement. From equation 3, the neutron porosity would be calculated and applied in that equation to get the true porosity. In the case of fitting only the neutron porosity, the correction factor B could be derived from getting the best fit of the neutron measurement. The equation in this case could be:

$$\phi_{formation} = B*\phi_{neutron} + (1-B)*\phi_{Density} \qquad (5)$$

This equation can also be used to compute a true porosity of an invaded gas formation independent of the depth of invasion of the formation.

A value of 0.70 for the gas correction factor A (see equation 4) has been found to give a good estimate of the true porosity independent of the depth of invasion in the gas reservoir. Additionally, the response of the density tool ($\phi_{Density}$) to invasion was compared with that of the neutron tool ($\phi_{APT-Neutron}$) at three different porosities and three lithologies. Tests showed that equation 4 is applicable at all the formation porosity measurements. The true porosity of the gas reservoir can be predicted with accuracy in the computed porosity of 1.3 pu at 20 pu, 0.8 pu at 10 pu and 0.6 pu at 5 pu (root mean square deviation). the same algorithm also seemed to applied at all the lithologies that were investigated.

The porosity computed by summing equal contributions from the density and neutron porosities (an approximate method that is sometimes used to determine formation porosity), gives twice the error than that obtained by using a gas correction factor of approximately 0.70, resulting in too low a porosity estimate in gas. Furthermore, if the depth of investigation is known (such as from an induction log), the true reservoir porosity can be calculated even more accurately. The present model can used to determine a correction factor that is dependent upon the depth of invasion in the reservoir. The invasion depth information can then be used along with this correction factor to yield an even more accurate value for the formation porosity.

Figure 9:
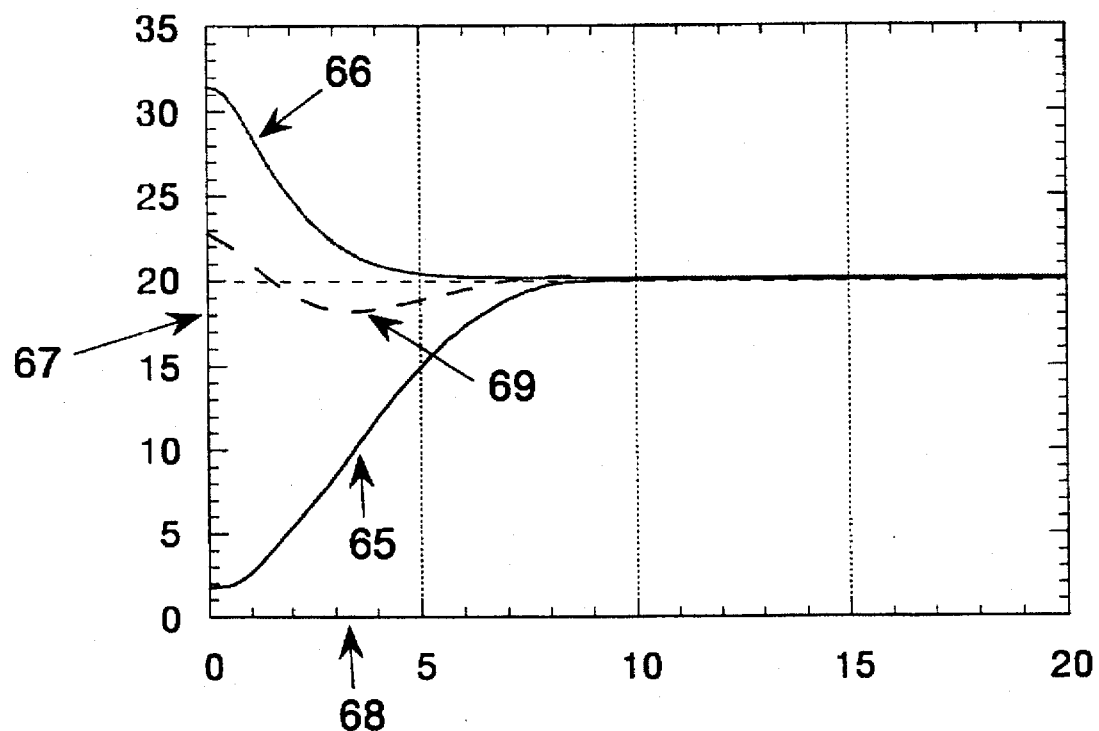
FIG. 9 shows density and neutron computed porosity and the computed formation porosity in a 20 up invaded gas formation as a function of depth of invasion.

Referring to FIG. 9, the neutron and density computed porosities 65 and 66 respectively are shown in a 20 up invaded gas formation as a function of apparent porosity 67 and depth on invasion 68. The true porosity of the formation 69 is indicated by the dotted horizontal line. The neutron near/array measurement 65 reads a low porosity in the presence of gas while the density tool reads a high porosity in gas. As the depth of invasion increases, the computed porosity's approach the true porosity. For the partially invaded formation, the best estimate of the true porosity can be obtained by using the equation:

$$\phi_{formation} = 0.70*\phi LTD + 0.30 \phi APT \qquad (6)$$

where LDT is the density tool and APT is the neutron logging tool.

Figure 10:
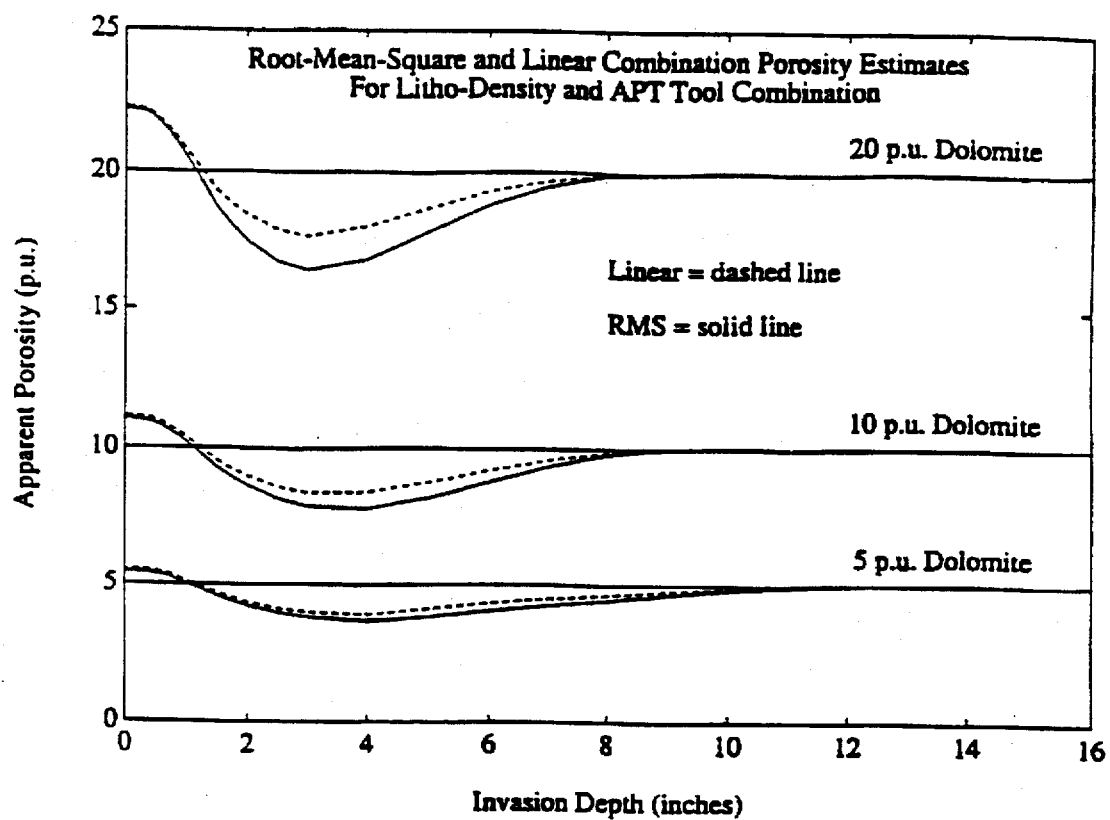
FIG. 10 shows comparisons of the present invention and the RMS method for porosities of 5, 10 and 20 up.

FIG. 10 shows the computed actual porosities in 20 p.u., 10 p.u. and 5 p.u. formations using two different methods. The dashed curve line represents measurements of the present invention and the solid curve line represents measurements using equation 6. The solid straight line is the true porosity. As shown, the present invention estimates a porosity that is closer to the true porosity than the method of equation 6. The difference is more profound as the porosity increases.

The effect of lithology on the APT and Litho-Density responses was investigated by comparing the results in 10 p.u. dolomite, limestone and sandstone formations. All other model parameters remained the same. The apparent neutron porosities were computed on their respective scales and the density porosities were estimated using the true matrix density. The actual formation porosity was determined using algorithm of the present invention. This method was observed to give the best estimate of the true formation porosity independent of the invasion depth, formation porosity and formation lithology.

Figure 11:
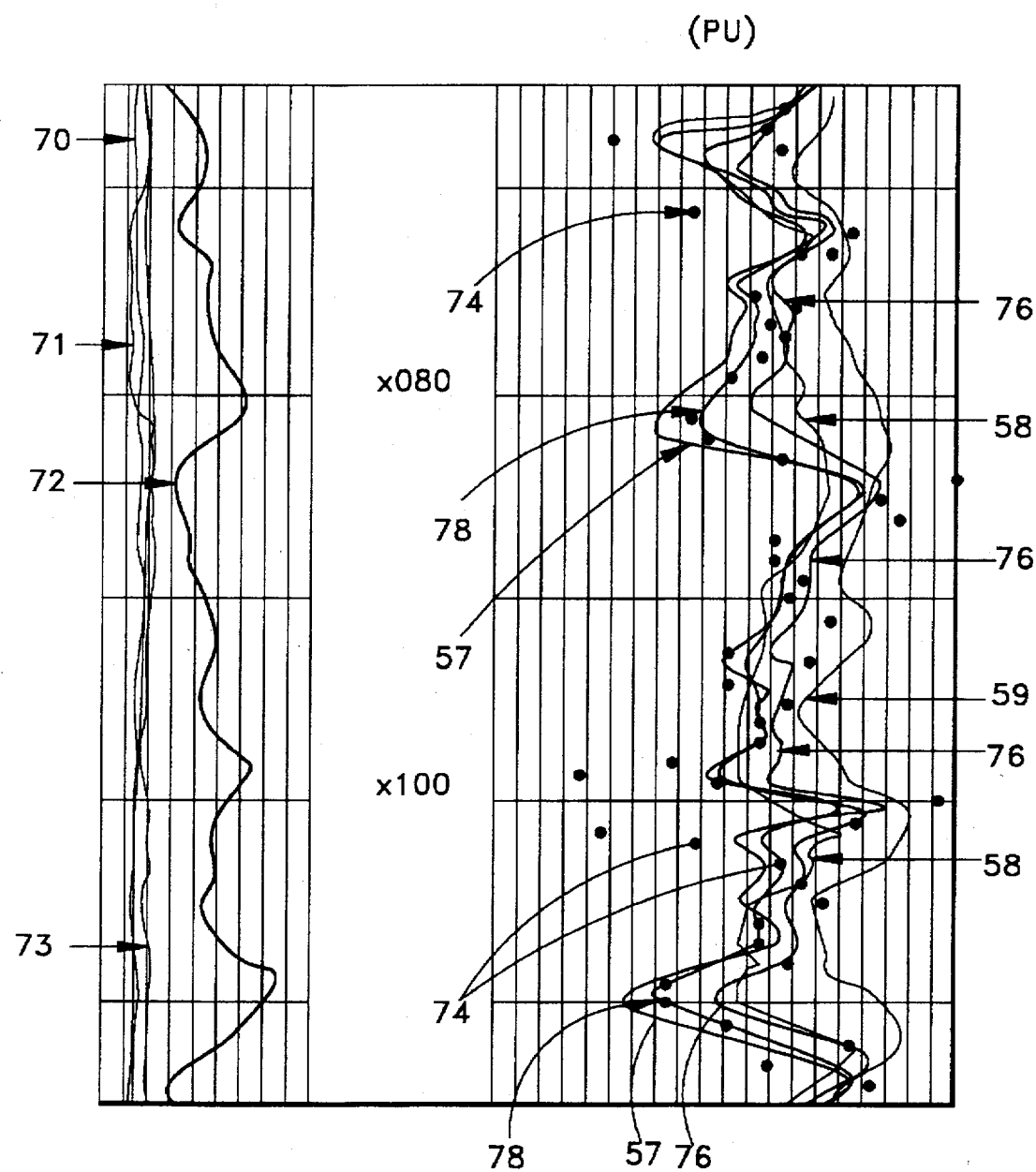
FIG. 11 shows a field log of results of current invention (linear method) for APT-Density measurements compared with CNL-Density measurements combined with an RMS computation of the formation porosity.

FIG. 11 shows an actual log taken using the present invention. The curves indicate the measured density porosity 57, APT porosity 58 and CNL porosity 59. The actual formation porosity has been computed using two methods 1. (Linear combination of the density and APT porosities (present invention) and 2.) RMS combination of the density and CNL porosities (traditional method). The computed porosities are compared to the measured core porosities indicated by dots on the log.

There are two primary gas bearing zones depicted in the log. The first zone is located approximately between ×79 feet and ×83 feet along the horizontal axis and the second zone is located approximately between ×109 feet and ×112 feet. At the first zone, the computed formation porosity 78 using the present invention is 79.9 pu, while the formation porosity 76 using the RMS density-CNL measurements is 68.9 pu. In this zone, the true formation porosity 74 measured from core samples is 78.0 pu. This comparison indicates that the present invention, using the density-APT porosities, yields a more accurate value of the actual formation porosity.

Similarly in the second gas bearing zone the linear density-APT computed porosity 78 is 61.7 pu while the RMS density-CNL computed porosity 76 is 53.5 pu. the core porosity in this case in 63.3 pu. The error in the estimation of the true porosity 78 using the present invasion to derive the actual formation porosity from the density and APT porosity measurements is 2.5%. The corresponding error in the RMS estimation from density-CNL is 15.5%.

The field log example indicates that the linear method using the density-APT measurements consistently gives a better estimation of the true reservoir porosity than the traditional methods of computing the porosity using density-CNL.

The method and apparatus of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method of determining the porosity of a gas reservoir invaded by a fluid in an earth formation without knowledge of the formation lithology or the depth of invasion of the invading fluid comprising the steps of:

(a) determining a porosity measurement of said formation from a density tool;

(b) determining a porosity measurement of said formation from a neutron tool, said neutron tool porosity measurement being taken in a manner such that the depth of investigation of the neutron tool is similar to the depth of investigation of said density tool;

(c) determining a correction factor from said porosity measurements;

(d) incorporating said correction factor into the porosity measurements; and (e) determining true porosity of said gas reservoir from said density tool and neutron tool porosity measurements, said porosity being the sum of percentages of density tool and neutron tool porosities, said percentages being interdependent.

2. The method of claim 1 wherein said true porosity incorporates a near detector/array detector ratio for the neutron porosity measurement and is expressed in a linear form $$\phi_{true[formation]} = A*\phi_{density} + (1-A)*\phi_{neutron\ near/array}$$

where A is a gas correction factor, $\phi_{density}$ is the density tool porosity measurement, $\phi_{neutron}$ is the neutron tool porosity measurement and near/array is the ratio of the near detector and array detector of the neutron tool.

3. The method of claim 2 wherein said percentages of density tool and neutron tool porosities are determined by making Monte Carlo simulations of the porosity responses of the density tool and neutron tool in the gas reservoir invaded by borehole fluids and fitting said porosities to a predetermined porosity of the formation.

4. The method of claim 3 wherein said density tool porosity is fitted to a predetermined porosity of the formation to determine correction factor A.

5. The method of claim 4 wherein the correction factor has a value range of approximately 0.68 to 0.72.

6. The method of claim 1 wherein said density tool porosity measurement is determined by:
   irradiating said formation with gamma rays from a source in said density tool;
   measuring a count of gamma rays in the formation indicative of the density of said formation; and
   determining a formation porosity from said density tool measurement.

7. The method of claim 1 wherein said density tool porosity measurement is determined by:
   irradiating a borehole and earth formation with low energy gamma radiation from a density source, such that the gamma radiation interacts with electrons of the materials in the borehole and the formation to produce populations of gamma rays;
   detecting the populations of gamma rays at a detector location in the borehole spaced longitudinally apart from the radiation source;
   generating a count signal indicative of the total number of detected gamma rays at the detector location;
   determining the formation density from the count signal; and
   determining a formation porosity from said density tool measurement.

8. The method of claim 7 wherein the count signal is corrected for gamma radiation activation by removing the activated gamma rays from the count signal.

9. The method of claim 1 wherein said neutron tool porosity measurement is determined by:
   irradiating said formation with neutrons from said neutron tool source;
   measuring a count of neutrons in the formation as an indication of the porosity of said earth formation; and
   determining a formation porosity from said neutron count.

10. The method of claim 1 wherein said neutron tool has a neutron source and at least two detectors and is placed in a borehole traversing said earth formation and wherein said neutron tool porosity measurement is determined by:
   positioning at least one first detector at a first location in the borehole close to said neutron source, said first detector being the near detector; and
   positioning at least one second detector at a second location such that the depth of investigation of said second detector is similar to that of the density tool;
   irradiating the subsurface formation with neutrons from said neutron source in a borehole;
   measuring populations of epithermal neutrons at said first and second detector locations in said borehole; and
   combining the measurements of the epithermal neutrons at the two detector locations.

11. The method of claim 10 wherein the distance from the second detector location to the neutron source is in the range of 28 to 33 centimeters.

12. The method of claim 10 wherein one of the detectors is an array of epithermal detectors.

13. The method of claim 10 further comprising, before said porosity determining step, the step of generating neutron count signals indicative of the magnitudes of the detected epithermal neutron populations at the respective first and second detector locations.

14. The method of claim 10 wherein the porosity determining step comprises the steps of:
   generating neutron count signals, the signals being indicative of the magnitudes of detected epithermal neutron populations at the respective first and second detector locations; and
   forming a ratio of the two epithermal neutron population count signals and deriving a signal representative thereof:
   converting the ratio signal according to a predetermined relationship to derive the porosity measurement.

15. The method of claim 1 wherein said neutron tool porosity measurement is determined comprising the steps of:
   positioning at least one detector at a first location in a borehole traversing said earth formation, said detector being a longitudinal distance from a neutron source;
   positioning at least one detector at a second location in the borehole from the neutron source such that the distance between the second detector and the source produces a depth of investigation in the neutron tool approximately the same as said density tool depth of investigation in said borehole;
   repetitively irradiating the borehole and earth formation with discrete bursts of high energy neutrons from the neutron source, which neutrons interact with nuclei of the materials in the borehole and the formation to produce therein populations of epithermal neutrons;
   detecting the populations of epithermal neutrons at the first and second detector locations in the borehole;
   generating count signals indicative of the magnitudes of the detected epithermal neutron populations at the respective first and second detector locations;
   detecting neutron source output intensity; deriving an indication of the variations in the intensity of the output of the neutron source and compensating the measured epithermal counts for the variations; and
   deriving from the first and second count signals a measurement signal representative of the porosity of the formation surrounding the borehole the measurement having reduced effects from the lithology of the formation.

16. The method of claim 1 wherein said neutron tool porosity measurement is determined by:
   repetitively irradiating a subsurface formation with bursts of neutrons from a neutron source;
   measuring, by means of a first detector spaced from the source at a given distance such that said distance between said detector and the source is the matrix density neutral distance, a count of epithermal neutrons indicative of epithermal neutrons within the irradiated subsurface formation as a measure of matrix density neutral porosity of subsurface formation; and combining the measurements of epithermal neutron counts from the measuring step for a succession of the bursts to provide an indication of subsurface formation porosity.

17. The method of claim 1 wherein said neutron tool porosity measurement is derived from a ratio of two detector porosity measurements.

18. The method of claim 17 wherein said neutron tool depth of investigation is determined by:

placing one detector at a location close to the neutron source, said detector being the near detector;

selecting a source to detector spacing such that when a detector is located at such spacing, the depth of investigation of said neutron tool is similar to that of said density tool in order to reduce the depth sensitivity between said density and neutron measurements; and placing a detector at said selected spacing.

19. The method of claim 1 wherein said density tool and neutron tool porosity measurements are determined simultaneously.

20. A method of determining the porosity of a gas reservoir invaded by a fluid in an earth formation, using density and neutron tool porosity measurements taken in a borehole traversing said earth formation, said method being insensitive to invasion depth of said fluid and comprising the steps of:

(a) choosing a detector/source spacing of the neutron tool such that the depth of investigation of said tools is similar;

(b) matching the depths of investigation of said density and neutron tools;

(c) determining a porosity measurement of the earth formation from each of said density and neutron tools;

(d) combining said porosity measurements from said density and neutron tools; and (e) generating a true reservoir porosity measurement, said porosity measurement being insensitive to the depth of invasion of fluids in said gas reservoir.

21. The method of claim 20 wherein the neutron porosity measurement is derived by:

generating an epithermal neutron population count signal at each of at least two detectors of said neutron tool;

forming a ratio of the two epithermal neutron population count signals and deriving a signal representative thereof; and converting the ratio signal according to a predetermined relationship to derive the porosity measurement.

22. The method of claim 20 wherein said neutron tool porosity measurement is determined comprising the steps of:

positioning at least one detector at a first location in the borehole that is a longitudinal distance from a neutron source;

positioning at least one detector at a second location in the borehole from the neutron source such that the distance between the second detector and the source produces a depth of investigation in the neutron tool approximately the same as a density tool depth of investigation in said borehole;

repetitively irradiating the borehole and earth formation with discrete bursts of high energy neutrons from the neutron source, which neutrons interact with nuclei of the materials in the borehole and the formation to produce therein populations of epithermal neutrons;

detecting the populations of epithermal neutrons at the first and second detector locations in the borehole;

generating count signals indicative of the magnitudes of the detected epithermal neutron populations at the respective first and second detector locations;

detecting neutron source output intensity;

deriving an indication of the variations in the intensity of the output of the neutron source and compensating the measured epithermal counts for the variations; and deriving from the first and second count signals a measurement signal representative of the porosity of the formation surrounding the borehole the measurement having reduced effects from the lithology of the formation.

23. An apparatus for measuring the porosity of a gas reservoir invaded by a fluid in an earth formation without knowledge of the depth of invasion of the invading fluid or the formation lithology comprising:

(a) a density tool capable of taking a porosity measurement;

(b) a neutron tool adjacent said density tool, said neutron tool having a source and detector spaced apart at a distance such that the depth of investigation of said neutron tool is similar to the depth of investigation of said density tool; and (c) a means for combining density and neutron tool porosity measurements to get a true porosity measurement of said invaded gas reservoir.

* * * * *